(12) United States Patent
Hollis

(10) Patent No.: US 8,994,403 B2
(45) Date of Patent: Mar. 31, 2015

(54) APPARATUS AND METHOD FOR SIGNAL TRANSMISSION OVER A CHANNEL

(75) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 13/587,376

(22) Filed: Aug. 16, 2012

(65) Prior Publication Data

US 2013/0038346 A1 Feb. 14, 2013

Related U.S. Application Data

(62) Division of application No. 12/059,065, filed on Mar. 31, 2008, now Pat. No. 8,253,442.

(51) Int. Cl.
*H03K 19/094* (2006.01)
*H03B 1/00* (2006.01)
*H04L 25/02* (2006.01)

(52) U.S. Cl.
CPC .................................. *H04L 25/0282* (2013.01)
USPC ............................................. 326/87; 327/109

(58) Field of Classification Search
CPC ... H03H 9/1021; H03H 9/215; H03H 9/0547; H03H 5/36; H03H 9/02023
USPC ............................................... 326/30, 80–87
See application file for complete search history.

(56) References Cited

U.S. PATENT DOCUMENTS

| | | | |
|---|---|---|---|
| 5,414,308 A | 5/1995 | Lee et al. | |
| 5,481,207 A | 1/1996 | Crafts | |
| 5,703,532 A | 12/1997 | Shin et al. | |
| 5,880,623 A | 3/1999 | Levinson | |
| 7,183,868 B1 * | 2/2007 | Wessendorf | 331/158 |
| 7,388,398 B1 | 6/2008 | Huang | |
| 7,821,293 B2 * | 10/2010 | Fazzi et al. | 326/34 |
| 2004/0178819 A1 | 9/2004 | New | |
| 2004/0189342 A1 | 9/2004 | Song | |
| 2004/0242171 A1 | 12/2004 | Hosokawa et al. | |
| 2007/0063738 A1 | 3/2007 | Fischer | |
| 2008/0024237 A1 | 1/2008 | Sheen et al. | |
| 2009/0146688 A1 | 6/2009 | Lane et al. | |

* cited by examiner

*Primary Examiner* — Thienvu Tran
(74) *Attorney, Agent, or Firm* — Knobbe, Martens, Olson & Bear, LLP

(57) ABSTRACT

Apparatus and methods related to data transmission are disclosed. One such apparatus includes a transmitter, a receiver, and a channel. The transmitter includes a pair of current sources and a pair of switches. Each of the switches conducts one of the current sources to the channel in response to input data. The receiver includes a first node configured to receive a signal over the channel. The receiver also includes a resistance generating a voltage drop between the first node and a second node. The receiver further includes a first transistor and a second transistor that are together configured to provide a voltage level to the second node based at least partly on the voltage drop. The resistance provides a negative feedback to center the mean signal level, thereby reducing intersymbol interference.

19 Claims, 6 Drawing Sheets

US 8,994,403 B2

APPARATUS AND METHOD FOR SIGNAL TRANSMISSION OVER A CHANNEL

CROSS-REFERENCE TO RELATED APPLICATION

This application is a divisional of U.S. patent application Ser. No. 12/059,065, filed Mar. 31, 2008, titled "APPARATUS AND METHOD FOR SIGNAL TRANSMISSION OVER A CHANNEL," the disclosure of which is hereby incorporated by reference in its entirety herein.

BACKGROUND OF THE INVENTION

1. Field of the Invention

Embodiments of the invention relate to electronic data transmission, and more particularly, in one or more embodiments, to electronic data transmission over a short channel.

2. Description of the Related Art

In electronic data transmission, various schemes have been used to enhance the accuracy of data transmission over unwanted noise and interference. Typically, electronic data is converted into a signal suitable for transmission over a channel, and is converted back into the original electronic data following reception at the far end.

FIG. 1A illustrates a conventional data transmission system 100 using a CMOS-to-CMOS interface. The system 100 includes a first integrated circuit (IC) 110, a second integrated circuit (IC) 120, and a channel 130 interconnecting the ICs 110, 120. The first IC 110 includes a transmitter 112 including a first transistor T1 and a second transistor T2. The first transistor T1 is a p-type MOS transistor. The second transistor T2 is an n-type MOS transistor. The first transistor T1 includes a source/drain connected to a voltage reference $V_{DD}$, a drain/source connected to a first node N1, and a gate connected to a second node N2. The second transistor T2 includes a source/drain connected to ground GND, a drain/source connected to the first node N1, and a gate connected to the second node N2. The first node N1 is configured to provide an output signal to the channel 130. The second node N2 is configured to receive a data stream from another component of the first IC 110.

The second IC 120 includes a receiver 122 including a third transistor T3 and a fourth transistor T4. The third transistor T3 is a p-type MOS transistor. The fourth transistor T4 is an n-type MOS transistor. The third transistor T3 includes a source/drain connected to the voltage reference $V_{DD}$, a drain/source connected to a third node N3, and a gate connected to a fourth N4. The second transistor T2 includes a source/drain connected to ground GND, a drain/source connected to the third node N3, and a gate connected to the fourth node N4. The third node N3 is configured to provide a resulting data stream to another component of the second IC 120. The fourth node N4 is configured to receive a signal from the first IC 110 over channel 130.

During operation, the first to fourth transistors T1-T4 serve as switches. Depending on the logic levels (for example, 1 or 0) of the data stream provided to the second node N2, one of the first transistor T1 or the second transistor T2 is turned on and the other is turned off, thereby pulling up the voltage level of the first node N1 to the voltage of the voltage reference $V_{DD}$ or pulling down the voltage level of the first node N1 to ground GND.

The voltage level of the first node N1 is provided to the fourth node N4 over the channel 130. Depending on the voltage level of the fourth node N4, one of the third transistor T3 or the fourth transistor T4 is turned on and the other is turned off, thereby pulling up the voltage level of the third node N3 to the voltage of the voltage reference $V_{DD}$ or pulling down the voltage level of the third node N3 to ground GND. In this manner, the output from the third node N3 replicates the original data stream received at the second node N2.

FIG. 1B is an eye diagram of a signal at the third node N3 of the receiver 122. Because the third transistor T3 and the fourth transistor T4 are fully on or off in response to a signal transmitted over the channel 130, the voltage swing at the third node N3 is between the voltage levels of the voltage reference $V_{DD}$ and ground GND.

BRIEF DESCRIPTION OF THE DRAWINGS

The embodiments will be better understood from the Detailed Description of Embodiments and from the appended drawings, which are meant to illustrate and not to limit the embodiments, and wherein.

DETAILED DESCRIPTION OF EMBODIMENTS

Figure 1A:
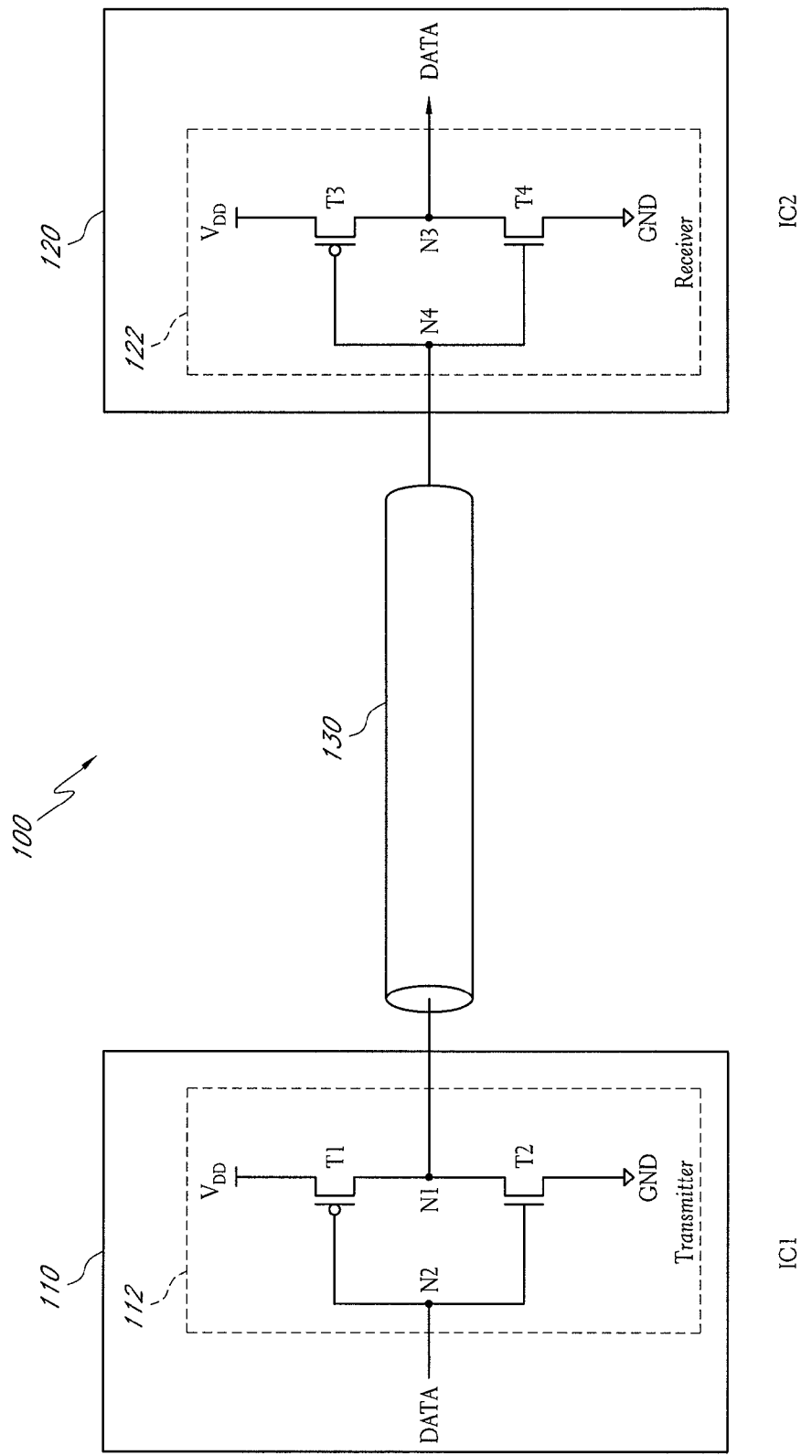
FIG. 1A is a circuit diagram of a conventional data transmission system employing a CMOS-to-CMOS interface.
Figure 1B:
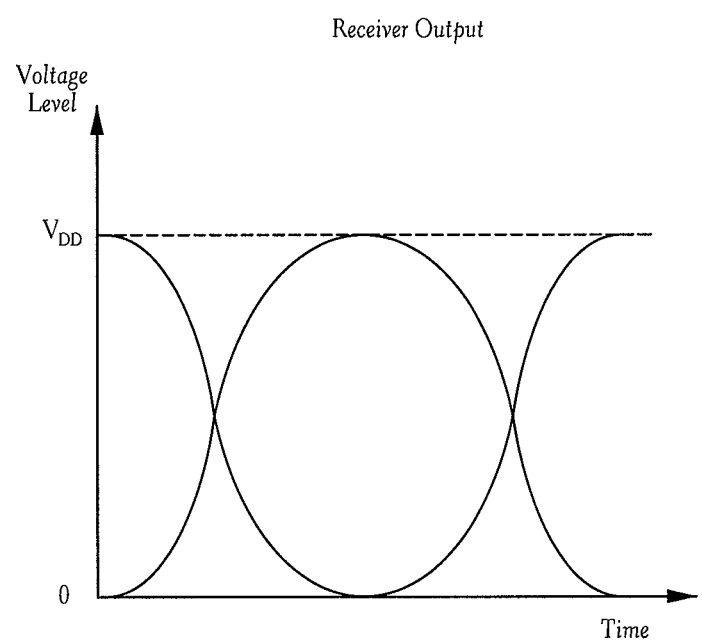
FIG. 1B is an eye diagram of an output signal from the receiver of the system of FIG. 1A.

Referring back to FIG. 1A, in the conventional data transmission system 100 of FIG. 1, ideally, a signal from the first node N1 in the transmitter 112 of the first IC 110 is transmitted to the fourth node N4 in the receiver 122 of the second IC 120, maintaining its waveform. In reality, however, one or more of the transmitter 112, the receiver 122, and the channel 130 in the system 100 include parasitic components, for example, parasitic capacitors, that affect the waveform.

For example, parasitic capacitors tend to resist a change in voltage at one or more of the nodes N1-N4. This is particularly so when a data stream transmitted over the channel 130 includes a series of the same values, for example, "111," "000," "11111111," or "0000000." Such a series of the same values accumulates charge on the parasitic capacitors. When a next data digit has a different value (for example, "0" after "1111111"), the parasitic capacitors resist the transition of the voltage at one or more of the nodes N1-N4. Such a behavior changes the waveform of the signal received by the receiver, and adversely affects the accuracy of data transmission. Such interference between data digits in a data stream can be referred to as intersymbol interference (ISI).

In one embodiment, a data transmission system includes a transmitter, a receiver, and a channel interconnecting the transmitter and the receiver. The transmitter includes current limiting circuitry. The receiver includes negative feedback circuitry. The negative feedback circuitry provides a centered mean signal level that reduces intersymbol interference (ISI).

Referring to FIG. 2, one embodiment of a data transmission system will be now described. The illustrated system 200 includes a first IC 210, a second IC 220, and a channel 230 electrically interconnecting the first IC 210 and the second IC 220. The first IC 210 may include a transmitter 212. The second IC 220 may include a receiver 222.

The transmitter 212 serves to convert a data stream into an electronic signal suitable for transmission over the channel 230. The illustrated transmitter 212 includes a pre-driver PD, a first transistor TR1, a second transistor TR2, a third transistor TR3, and a fourth transistor TR4. The third transistor TR3, the first transistor TR1, the second transistor TR2, and the fourth transistors TR4 are connected in order between a voltage reference $V_{DD}$ and ground GND. The voltage reference $V_{DD}$ may be provided by a voltage source.

In the illustrated embodiment, the pre-driver PD is configured to receive a data stream in a single-ended form. The pre-driver PD includes first and second outputs O1, O2 that provide the first and second transistors TR1, TR2, respectively, with signals in response to the data stream. The signals may have the same logic level as each other, and may have logic levels inverted from those of the data stream. In one embodiment, the pre-driver PD may include an inverter. In certain embodiments, the pre-driver PD may simultaneously turn off the first and second transistors TR1, TR2, thus providing 3-state controls.

The first transistor TR1 may be a p-type MOS transistor. The first transistor TR1 includes a source/drain electrically connected to a second node N2, a drain/source electrically connected to a first node N1, and a gate electrically coupled to the first output O1 of the pre-driver PD. The first node N1 is electrically connected to the channel 230.

The second transistor TR2 may be of a type opposite from the type of the first transistor TR1. In the illustrated embodiment, the second transistor TR2 is an n-type MOS transistor. The second transistor TR2 includes a source/drain electrically connected to a third node N3, a drain/source electrically connected to the first node N1, and a gate electrically coupled to the second output O2 of the pre-driver PD. In the illustrated embodiment, the first and second transistors TR1, TR2 may have substantially the same size as each other, but as is understood by skilled artisans, the lower carrier mobility in the p-type channel often requires the p-type device to be sized larger than the n-type device to balance the strength of the respective devices.

The third transistor TR3 may be a p-type MOS transistor. The third transistor TR3 includes a source/drain electrically connected to the voltage reference $V_{DD}$, and a drain/source electrically connected to the second node N2. The third transistor TR3 further includes a gate configured to receive a first control signal CS1. Details of the first control signal CS1 will be described later in connection with the operation of the transmitter 212.

The fourth transistor TR4 may be an n-type MOS transistor. The fourth transistor TR4 includes a source/drain electrically connected to ground GND, and a drain/source electrically connected to the third node N3. The fourth transistor TR4 further includes a gate configured to receive a second control signal CS2. In the illustrated embodiment, the third and fourth transistors TR3, TR4 may have substantially the same size as each other. Details of the second control signal CS2 will be described later in connection with the operation of the transmitter 212.

The receiver 222 serves to receive the electronic signal from the transmitter 212 sent over the channel 230, and converts the signal back into the original data stream in a single-ended form. The illustrated receiver 222 includes a fifth transistor TR5, a sixth transistor TR6, a seventh transistor TR7, a resistance R, and an inverter IV. In one embodiment, the resistance R may be an explicit resistor. In other embodiments, the resistance may be provided by a line having an inherent resistance.

The fifth and sixth transistors TR5, TR6 are electrically connected in order between the voltage reference $V_{DD}$ and ground GND. The fifth and sixth transistors TR5, TR6 can collectively form an inverter. In the illustrated embodiment, the fifth transistor TR5 may be a p-type MOS transistor. The fifth transistor TR5 includes a source/drain electrically connected to the voltage reference $V_{DD}$, a drain/source electrically connected to a fifth node N5, a gate electrically connected to a sixth node N6. An input of the inverter IV is coupled to the fifth node N5 to receive the voltage level. The sixth node N6 is coupled to the channel 230 to receive the electronic signal while the seventh transistor TR7 is on.

The sixth transistor TR6 may be of a type opposite from the type of the fifth transistor TR5. In the illustrated embodiment, the sixth transistor TR6 is an n-type MOS transistor. The sixth transistor TR6 includes a source/drain electrically connected to ground, a drain/source electrically connected to the fifth node N5, and a gate electrically connected to the sixth node N6. In the illustrated embodiment, the fifth and sixth transistors TR5, TR6 may have substantially the same size as each other. Each of the fifth and sixth transistors TR5, TR6 may have a size smaller than those of the first and second transistors TR1, TR2.

The seventh transistor TR7 is electrically connected between the channel 230 and the sixth node N6. The seventh transistor TR7 serves as a switch which enables the receiver 222 while the second IC 220 is supposed to receive data from the first IC 210. The seventh transistor TR7 includes a source/drain electrically connected to the channel 230, and a drain/source electrically connected to the sixth node N6. The seventh transistor TR7 further includes a gate configured to receive a receiver enable control signal RxEn from the first IC 210 over the channel 230 or from within the second IC 220. In other embodiments, one or more of the first to seventh transistors TR1-TR7 can be replaced with other field effect transistors, not limited to MOS transistors. All devices listed described in the various embodiments may additionally be of the bi-polar variety.

The resistance R is electrically connected between the fifth node N5 and the sixth node N6. The value of the illustrated resistance is determined by the strength of transistors TR5, TR6. If the resistance is chosen to high, then it has little effect on the circuit. If, on the other hand, the resistance is chosen too low, then the amplifier will be bypassed completely by the low-resistive forward current path. The resistance value must balance out the strength of the amplifier, and the optimal value may be found through trial and error. In one embodiment, the resistance is about 100 ohms.

The resistance R serves to provide a negative feedback to the system 200. The fifth and sixth transistors TR5, TR6 together serve as an inverter that logically inverts a modified signal to generate an inverted signal. The resistance R feeds back a portion of the inverted signal to generate the modified signal. Details of the function of the resistance R will be described below in connection with the operation of the system 200. In certain embodiments, the receiver 222 may further include a capacitance or other frequency dependent network between the fifth node N5 and the sixth node N6 to shape the frequency response of the receiver 222.

The inverter IV is configured to receive a signal from the fifth node N5, and to provide an output to one or more of components of the second IC 220. The output represents the original data stream from the first node N1 of the first IC 210.

The channel 230 may include one or more electrically conductive lines. In one embodiment, the lines may have a length between about 100 µm and about 10 mm. In the context of this document, a channel having this range of length may be referred to as a "short" channel. In other embodiments, the lines may have a different length that is shorter or longer than the short channel. Longer channels may further require matched termination to reduce signal reflections.

During operation, each of the first transistor TR1 and the second transistor TR2 serves as a switch. Each of the third transistor TR3 and the fourth transistor TR4 serves as a current source/sink, referred to generally as a current source herein, which provides a current between about 0.1 mA and about 1.0 mA. The term "current source" in the appended claims is also intended to refer to a current sink. In certain embodiments, the first and second transistors TR1, TR2 may be simultaneously turned off by the pre-driver PD, thus providing 3-state controls.

Depending on the logic levels (for example, 1 or 0) of data digits provided to the pre-driver PD in the transmitter 212, during normal operation, one of the first transistor TR1 or the second transistor TR2 is turned on and the other is turned off. If the value of a data bit is 1, the pre-driver PD generates "low" logic signals, and thus the first transistor TR1 is turned on and the second transistor TR2 is turned off, thereby pulling up the voltage level of the first node N1 to the voltage level of the second node N2. The voltage level of the second node N2 is the voltage level of the voltage reference $V_{DD}$ less the source-drain voltage of the third transistor TR3. The source-drain voltage of the third transistor TR3 is fundamentally linked to the device size, but may be modified by adjusting the voltage level of the first control signal CS1, which can be an analog signal.

If the value of a data bit is 0, the pre-driver PD generates "high" logic signals, and thus the second transistor TR2 is turned on and the first transistor TR1 is turned off, thereby pulling down the voltage level of the first node N1 to the voltage level of the third node N3. The voltage level of the third node N3 is 0V (ground) plus the drain-source voltage of the fourth transistor TR4. The drain-source voltage of the fourth transistor TR4 is again related to the device size and may also be modified by adjusting the voltage level of the second control signal CS2, which can be an analog signal.

In certain embodiments, the voltage levels of the first and second control signals CS1, CS2 may be adjusted during a training period, such as during initialization and power up or at the beginning of data transmission between the first and second ICs 210, 220. Such adjustment can be performed based at least partly on feedback from the second IC 220. The first and second control signals CS1, CS2 may additionally be provided by a current mirror circuit, a bandgap reference circuit, or may simply be selected from one or more power supply rails available on the integrated circuit. For example, the control signal applied to the p-type device may come from ground GND and the control signal applied to the n-type device may come from the voltage reference $V_{DD}$.

Figure 2A:
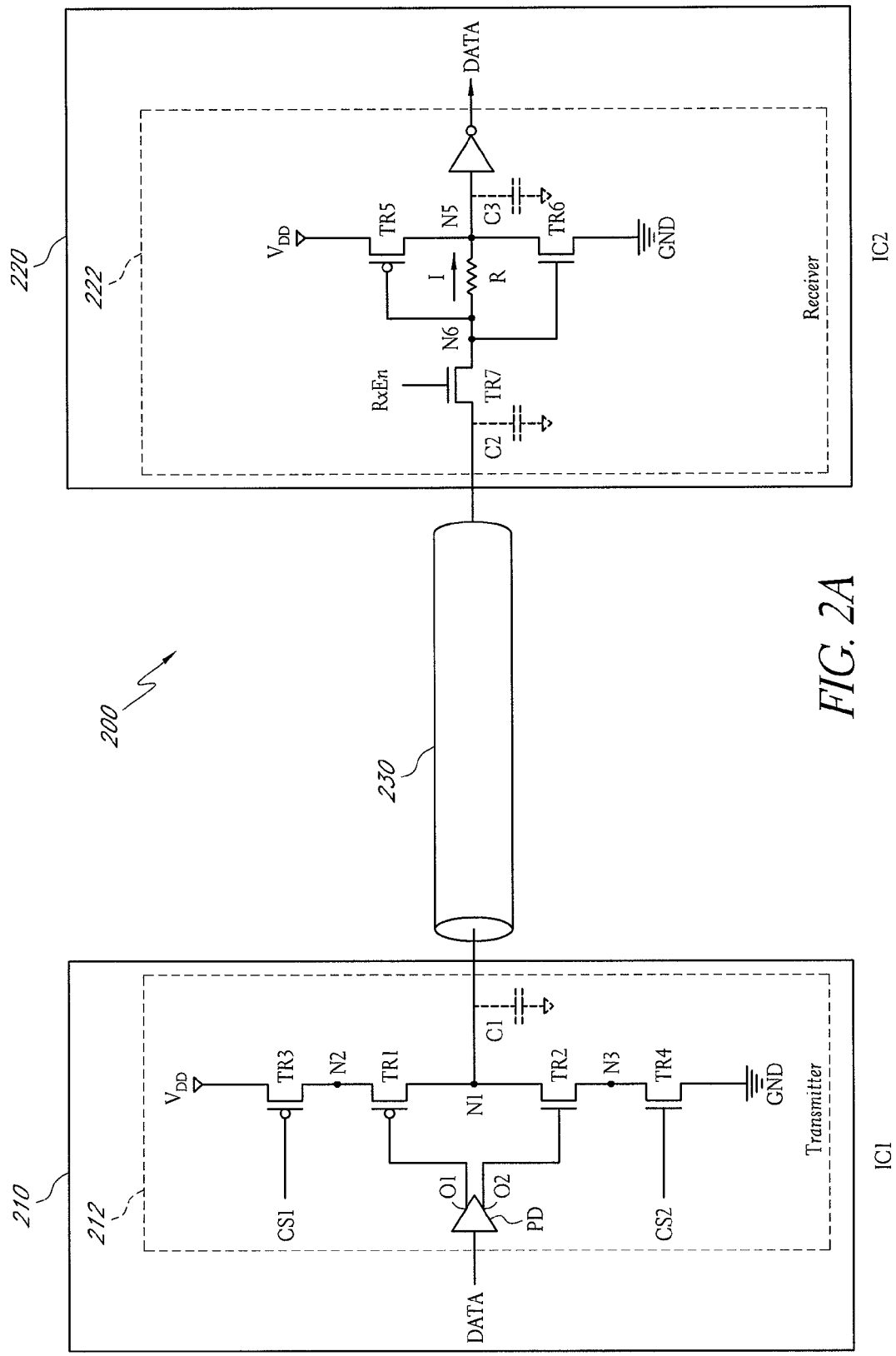
FIG. 2A is a circuit diagram of a data transmission system employing an interface according to one embodiment.

While the transmitter 212 sends data to the receiver 222, the receiver enable signal RxEn is activated to turn on the seventh transistor TR7. The voltage level of the sixth node N6 in the receiver 222 varies, depending on the voltage level of the first node N1. The voltage level of the sixth node N6 is lower or higher than the voltage level of the first node N1 due to a voltage difference associated with components between the first node N1 and the sixth node N6, for example, the channel 230, and the seventh transistor TR7. As shown in FIG. 2A, the transistor TR7 which serves to enable the receiver 222 may be implemented as an n-type device. Similarly, the transistor TR7 could be implemented with a p-type device, which would simply require that the enable signal RxEn be the complement of the enable signal RxEn that would be applied to an n-type device. In one embodiment, the transistor TR7 may further be replaced by a CMOS switch consisting of both an n-type device and a p-type device connected in parallel, as is well known in the art. Such a switch would require the enable signal RxEn to be provided along with its complement, with RxEn connected to the gate of the n-type device and the complementary signal connected to the gate of the p-type device. Such a configuration behaves ideally across a larger common mode signal range than either of the individual transistors would.

The resistance R provides a forward current path from the sixth node N6 to the fifth node N5. Thus, a current I flows through the resistance R, thereby creating a voltage drop across the resistance R. Thus, the voltage level of the fifth node N5 is offset from the voltage level of the sixth node N6 by a voltage difference of I×R. The resistance R also serves to boost current flow therethrough.

Figure 2B:
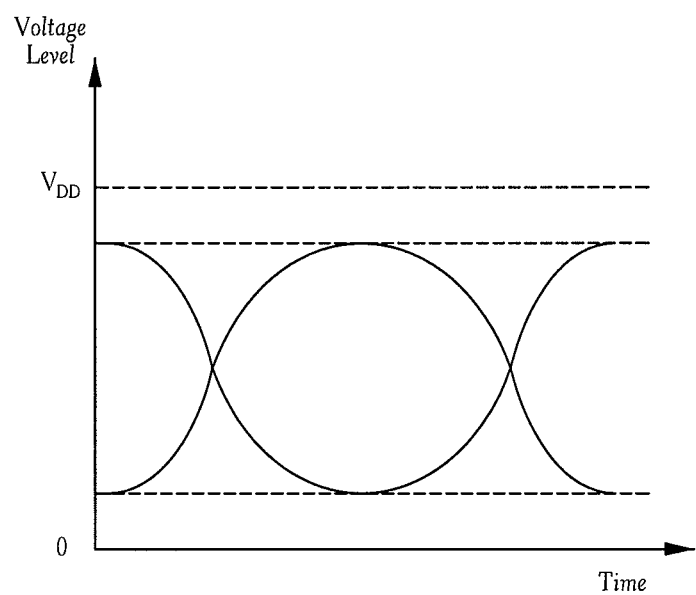
FIG. 2B is an eye diagram of an output signal from the receiver of the system of FIG. 2A.

In the illustrated embodiment, the sixth node N6 is electrically connected to the gates of the fifth and sixth transistors TR5, TR6. In addition, the fifth node N5 is electrically connected to the drain/source regions of the fifth and sixth transistors TR5, TR6. Thus, the voltage difference between the sixth node N6 and the fifth node N5 provides the gate-drain voltages of the fifth transistor TR5 and sixth transistor TR6. This configuration only partially turns on one of the fifth transistor TR5 or the sixth transistor TR6 while turning off the other, thereby maintaining the voltage swing at the fifth node N5 lower than the voltage level of the voltage reference $V_{DD}$ and higher than ground GND, as illustrated in FIG. 2B. While partially dependent on transistors TR5, TR6 and R, the maximum voltage level at the fifth node N5 may be adjusted, in part, by adjusting the second control signal CS2. The minimum voltage level at the fifth node N5 may be adjusted, in part, by adjusting the first control signal CS1.

The inverter IV is configured to receive a signal from the fifth node N5, and invert the signal. In addition, the inverter IV provides a data stream having a full voltage swing to another component of the second IC 220. For example, the data stream may have the maximum voltage level of $V_{DD}$ and the minimum voltage level of 0 V.

As illustrated in FIG. 2A, the system 200 includes parasitic capacitors C1, C2, C3 which are inherent in the system 200. Each of the illustrated capacitors C1, C2, C3 is part of the transmitter 212 or the receiver 222. A skilled artisan will, however, appreciate that other components of the system 200 may also exhibit additional parasitic capacitance.

Because the voltage swings at the first node N1, the sixth node N6, or the fifth node N5 are not a full swing between the reference voltage $V_{DD}$ and ground GND, the parasitic capacitors C1, C2, C3 store less charge than those of the conventional system 100 of FIG. 1A. Thus, the system 200 is less adversely affected by the parasitic capacitors C1, C2, C3.

In addition, the third and fourth transistors TR3, TR4 provide control over current draw, thereby being capable of adjusting slew rate and power consumption. For example, the third and fourth transistors TR3, TR4 may reduce current flowing therethrough to lower slew rate and/or power consumption. A reduction in the current level will reduce simultaneous switching noise generated by the transmitter 212 and the receiver 222.

In the embodiment described above, however, the resistance R in the receiver 222 provides a negative resistive feedback, which centers the mean signal level, thereby maintaining a symmetric waveform (for example, more regular rise/ fall crossings) for subsequent buffer stages. Such a configuration, while providing a smaller swing, reduces possible ISI and jitter in the context of the receiver 222.

In addition, the receiver 222 may need no voltage reference because it can provide its own voltage difference across the resistance R, and may also require no offset adjustment as may otherwise be required in a sense amplifier, or other pseudo-differential type receiver. Avoiding the need for a voltage reference can be advantageous for low swing applications where there is not sufficient margin to overcome reference voltage error. Further, avoiding the need for synchronized clock edges to be used with sense-amplifier style data detection also simplifies the receiving system.

Figure 3:
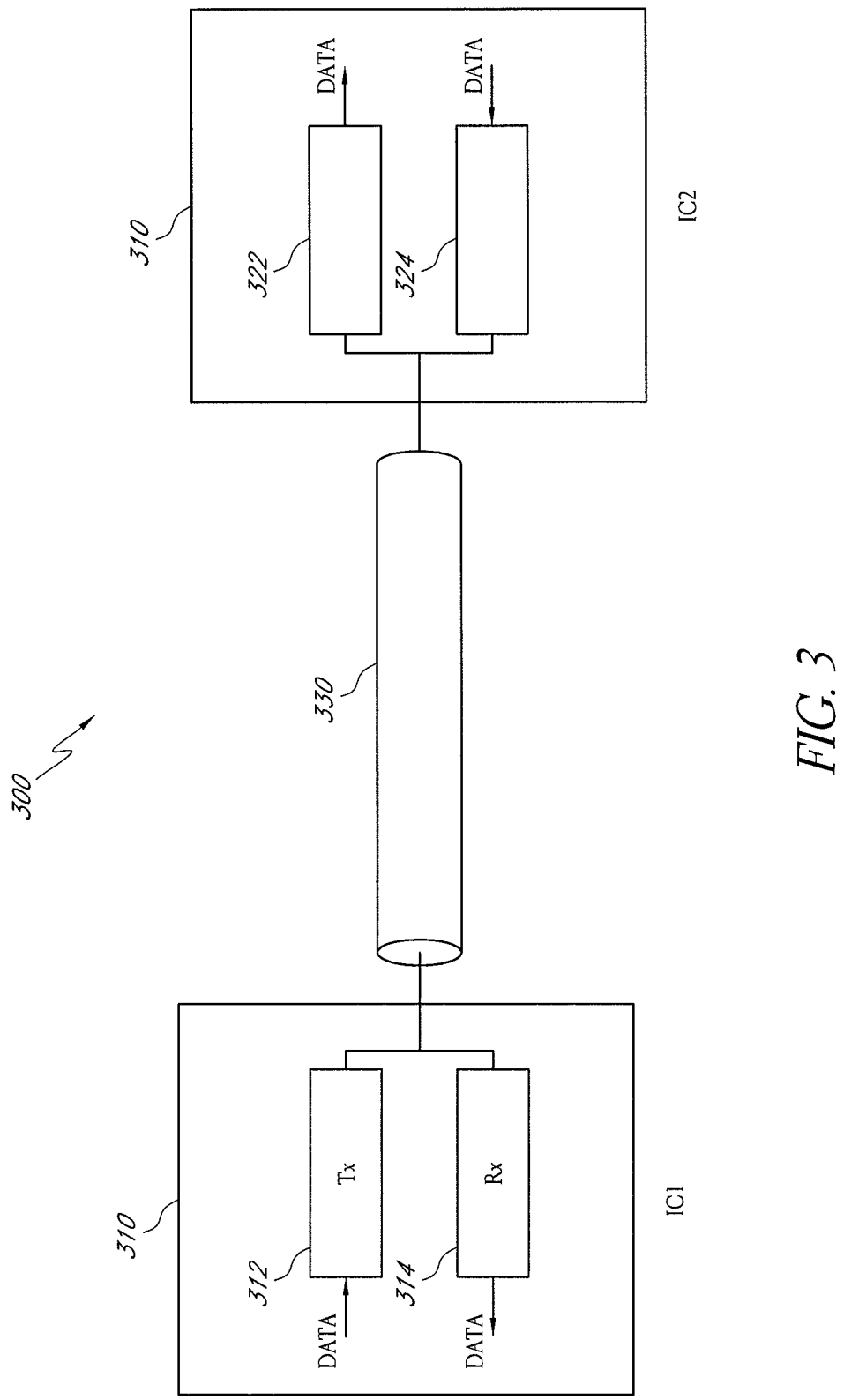
FIG. 3 is a schematic block diagram of a system including two integrated circuits and a channel for bi-directional data transmission according to one embodiment.

Referring to FIG. 3, another embodiment of a system for bi-directional data transmission will be now described. In the illustrated embodiment, the system 300 includes a first IC 310, a second IC 320, and a channel 330 interconnecting the first IC 310 and the second IC 320. The first IC 310 includes a first transmitter 312 and a first receiver 314. The second IC 320 includes a second transmitter 322 and a second receiver 324. Each of the first transmitter 312 and the second transmitter 322 can have the same configuration as the transmitter 212 of FIG. 2A. Each of the first receiver 314 and the second receiver 324 can have the same configuration as the receiver 222 of FIG. 2A.

During operation, when the first IC 310 transmits data to the second IC 320, the first transmitter 312 sends the data to the second receiver 324 over the channel 330. The second receiver 324 is enabled by providing a receiver enable signal RxEn to the second receiver 324. Similarly, when the second IC 320 transmits data to the first IC 310, the second transmitter 322 provides the data to the first receiver 314 over the channel 330. The first receiver 314 is enabled by activating a receiver enable signal RxEn to the first receiver 314.

In one embodiment, the first IC 310 is a memory device including a memory array. The first transmitter 312 may serve to transmit data from the memory array to the second IC 320. The first receiver 314 may serve to receive data from the second IC 320 and provide it to the memory array. A skilled artisan will appreciate that the first IC 210 may form various other types of electronic components.

Similar to the first IC 310, in one embodiment, the second IC 320 may be a memory device including a memory array. The second transmitter 322 may serve to transmit data from the memory array to the first IC 310. The second receiver 324 may serve to receive data from the first IC 310 and provide it to the memory array. A skilled artisan will appreciate that the second IC 320 may form various other types of electronic components.

In other embodiments, a data transmission system may include three or more ICs. Each of the ICs may include a transmitter, a receiver, or both, as described above in connection with FIGS. 2A and 3. At least a pair of the ICs can carry out uni-directional or bi-directional data transmission. A skilled artisan will appreciate that the embodiments described above can be adapted for various configurations of data transmission systems. In embodiments wherein only a single receiver is present at each or either end of the channel 330, the enable signal RxEn and transistor TR7 may be eliminated, as the receiver enable is only required to select between multiple receivers.

Figure 4:
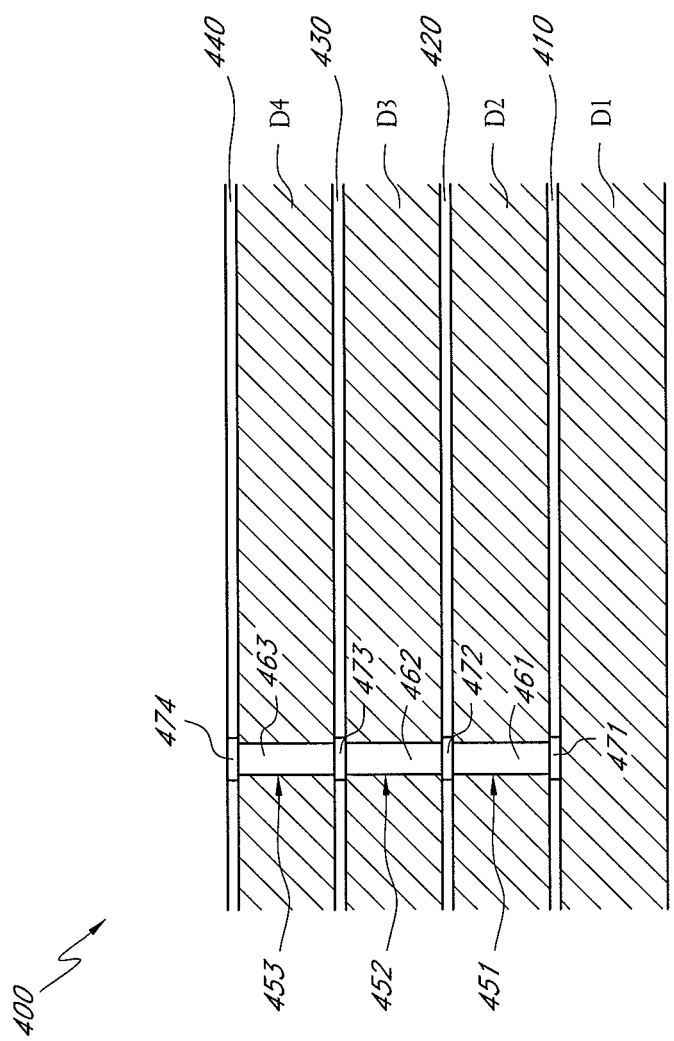
FIG. 4 is a schematic cross section of an electronic device including stacked integrated circuits with short channels according to one embodiment.

Referring to FIG. 4, one embodiment of an IC device that can employ any of the embodiments described above will be described. The illustrated IC device 400 includes multiple dies D1-D4 stacked over one another. Each of the dies D1-D4 includes an integrated circuit 410-440 formed thereon. Some of the dies D1-D4 may include a plurality of integrated circuits formed thereon. A skilled artisan will appreciate that some components of the integrated circuits may be formed in recesses or trenches (not shown) in the dies D1-D4.

As shown, each of the dies D2-D4, except for the lowermost die D1, may further include one or more vias 451-453 penetrating therethrough. In certain embodiments, the vias may be formed only partially through the die. In some embodiments, the lowermost die D1 may additionally include one or more vias similar to the vias 451-453. The vias 451-453 may be formed vertically through the dies D2-D4. The dies D2-D4 may further include electrically conductive plugs 461-463. Each of the plugs 461-463 may form at least part of a channel between two ICs on two of the dies D1-D4 stacked over each other.

In the illustrated embodiments, the IC device 400 further includes conductive bumps 471-474 and conductive wirings (not shown). Each of the conductive wirings provides electrical connection between an IC and a bump on the same die. Each of the bumps 471-474 provides electrical connection between a plug and a conductive wiring. The conductive bumps 471-474 and the conductive wirings may also form part of a channel between two ICs on two of the dies D1-D4.

The embodiments described above can be adapted for data transmission between two ICs formed on different dies. In addition, those embodiments can also be adapted for data transmission between two IC formed on the same die.

The embodiments described above can be adapted for various electronic devices. Examples of the electronic devices can include, but are not limited to, consumer electronic products, electronic circuits, electronic circuit components, parts of the consumer electronic products, electronic test equipments, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

One embodiment is an apparatus including: a channel, a transmitter configured to transmit a signal over the channel, and a receiver. The transmitter includes a first switch coupled to a first current source and to an output node. The first switch is configured to conduct the first current source to the output node when activated, and to be an open circuit when deactivated. The transmitter also includes a second switch coupled to a second current source and to the output node. The second switch is configured to conduct the second current source to the output node when activated, and to be an open circuit when deactivated. The receiver includes a first inverter including an input and an output. The input of the first inverter is configured to receive the signal transmitted over the channel. The receiver also includes a second inverter including an input electrically coupled to the output of the first inverter; and a resistance electrically coupled between the input of the first inverter and the output of the first inverter.

Another embodiment is an apparatus configured to receive a signal over a channel. The apparatus includes: a first node configured to receive a signal over a channel; a second node; and a feedback circuit including a first end and a second end. The first end is coupled to the first node, and the second end is coupled to the second node. The apparatus also includes a first inverter including an input and an output. The input of the first inverter is coupled to the first node, and the output of the first inverter is coupled to the second node. The apparatus further includes a second inverter including an input and an output, the input of the second inverter being coupled to the second node.

Yet another embodiment is a method for transmitting data between two disparate integrated circuits (ICs). The method includes receiving, by a first IC circuit, a digital signal sent over a channel; logically inverting a modified signal to generate an inverted signal; feeding back a portion of the inverted signal to the digital signal to generate the modified signal; and logically inverting the inverted signal to generate a digital output signal.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

I claim:

1. An apparatus comprising:
  a first integrated circuit comprising a receiver, the receiver comprising:
    a first node configured to receive a signal transmitted over a channel interconnecting at least the first integrated circuit and a second integrated circuit;
    a second node;
    a transistor disposed in a signal path between the channel and the first node, the transistor configured to selectively electrically couple the signal transmitted over the channel to the first node responsive to a control signal provided to the transistor;
    a first inverter including an input and an output, the input of the first inverter being coupled to the first node, the output of the first inverter being coupled to the second node, wherein the first inverter comprises a transistor of a first type and a transistor of a second type, the first type being opposite of the second type, the transistor of the first type configured to only partially turn on while the transistor of the second type is turning off to thereby maintain the second node at a voltage level that is lower than a reference voltage and higher than ground;
    a second inverter including an input and an output, the input of the second inverter being coupled to the second node; and
    a feedback circuit including a first end and a second end, the first end being coupled to the first node, the second end being coupled to the second node, the feedback circuit configured to provide negative resistive feedback from the second node to the first node, such that a symmetric waveform at the output of the second inverter is maintained.

2. The apparatus of claim 1, wherein the feedback circuit comprises an explicit resistor electrically coupled between the first and second nodes.

3. The apparatus of claim 2, wherein the explicit resistor is configured to feed back a portion of the first inverter output to the first inverter input.

4. The apparatus of claim 2, wherein the explicit resistor has a first terminal directly electrically coupled to the input of the first invert and a second terminal directly electrically coupled to the output of the first inverter.

5. The apparatus of claim 1, wherein:
  the first transistor includes a source/drain coupled to the reference voltage, a drain/source coupled to the second node, and a gate coupled to the first node; and
  the second transistor includes a source/drain coupled to ground, a drain/source coupled to the second node, and a gate coupled to the first node.

6. The apparatus of claim 1, wherein the channel is configured to bi-directionally transmit data between the first integrated circuit and the second integrated circuit.

7. The apparatus of claim 1, wherein the first integrated circuit further comprises a transmitter configured to transmit data to at least the second integrated circuit.

8. The apparatus of claim 1, wherein the channel comprises an electrically conductive plug disposed in a via penetrating through a die, wherein the first integrated circuit is formed on the die.

9. The apparatus of claim 1, wherein the channel has a length between about 100 μm and about 10 mm.

10. A method of transmitting data among two or more different integrated circuits (ICs), the method comprising:
  receiving, by a receiver of a first IC, a digital input signal sent over a channel interconnecting the first IC with a second IC;
  selectively electrically coupling, by a transistor disposed in a signal path between the channel and an input of an inverter of the receiver of the first IC, the digital input signal to the input of the inverter response to a control signal;
  inverting, by the inverter of the receiver of the first IC, the digital input signal to generate an inverted signal, wherein the inverter comprises a first transistor and a second transistor, the first transistor having a different conductivity type than the second transistor, wherein the first transistor is configured to only partially turn on while the second transistor is turning off so as to maintain an output of the inverter at a voltage level that is lower than a reference voltage and higher than ground;
  feeding back, by the receiver of the first IC, a portion of the inverted signal to the digital input signal to modify the digital input signal; and
  inverting, by a second inverter of the receiver of the first IC, the inverted signal to generate a digital output signal, wherein feeding back provides negative resistive feedback to maintain a symmetric waveform at an output of the second inverter.

11. The method of claim 10, further comprising transmitting the digital input signal from the second IC to the first IC over the channel.

12. The method of claim 11, wherein transmitting the digital input signal comprises:
  receiving input data;
  receiving a first voltage reference and a second voltage reference, the second voltage reference being lower in voltage than the first voltage reference;
  generating a third voltage reference, wherein the third voltage reference is lower in voltage than the first voltage reference, and wherein the third voltage is higher in voltage than the second voltage reference;
  generating a fourth voltage reference, wherein the fourth voltage reference is lower in voltage than the third voltage reference, and wherein the fourth voltage is higher in voltage than the second voltage reference; and coupling the channel to one of the third or fourth voltage reference in response to the received input data.

13. The method of claim 12, further comprising adjusting at least one of the third and fourth voltage references based at least partly on feedback from the first IC circuit.

14. The method of claim 10, wherein the channel has a length between about 100 μm and about 10 mm.

15. The method of claim 10, wherein feeding back is performed by way of an explicit resistor.

16. A method of transmitting data among two or more different integrated circuits (ICs), the method comprising:
   transmitting data from a second IC on a second die to a first IC on a first die, the first die and the second die being included in a plurality of dies stacked on one another;
   receiving, by the first IC, a digital input signal sent over a channel from the second IC;
   selectively electrically coupling, by a transistor disposed in a signal path between the channel and an input of an inverter of the receiver of the first IC, the digital input signal to the input of the inverter response to a control signal;
   inverting the digital input signal to generate an inverted signal, wherein inverting the digital input signal maintains the inverted signal at a voltage level that is lower than a reference voltage and higher than ground;
   feeding back a portion of the inverted signal to the digital input signal to modify the digital input signal; and
   inverting the inverted signal to generate a digital output signal, wherein feeding back maintains a symmetric waveform of the digital output signal.

17. The method of claim 16, wherein transmitting comprises transmitting data through a via penetrating at least one of the plurality of dies stacked on one another, the channel comprising an electrically conductive plug filling at least a portion of the via.

18. The method of claim 16, wherein transmitting is performed by a transmitter of the second IC that has substantially the same configuration as a transmitter of the first IC.

19. The method of claim 16, wherein a receiver of the first IC used to receive the digital input signal has substantially the same configuration as a receiver of the second IC.

* * * * *